Oct. 14, 1947.   F. W. BILLIG   2,429,046
COMBINED POKER AND TONGS
Filed Sept. 27, 1945
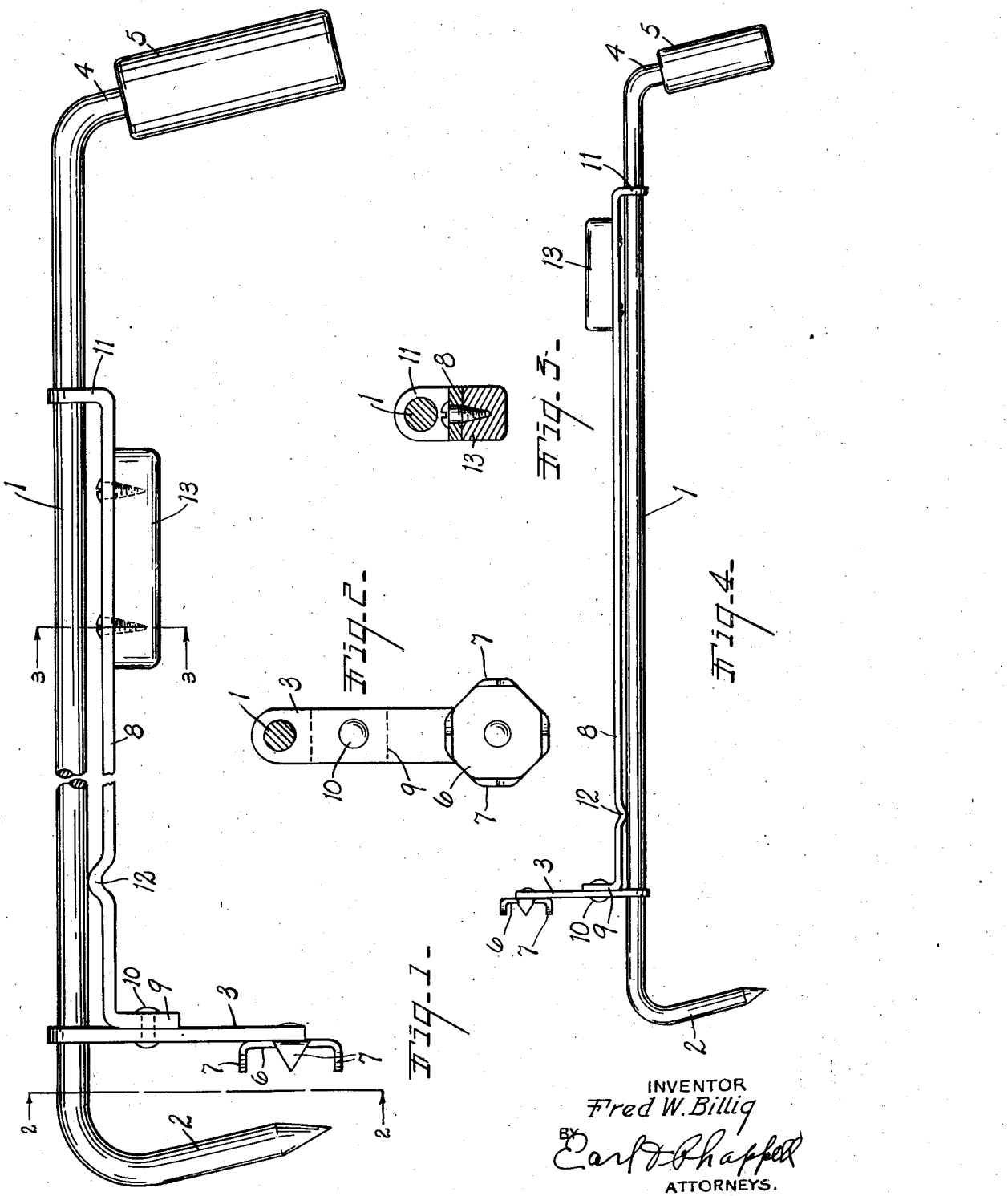
INVENTOR
*Fred W. Billig*
BY
*Earl F. Chappell*
ATTORNEYS.

Patented Oct. 14, 1947

2,429,046

UNITED STATES PATENT OFFICE 2,429,046

COMBINED POKER AND TONGS

Fred W. Billig, Jackson, Mich.

Application September 27, 1945, Serial No. 618,829

4 Claims. (Cl. 294—11)

This invention relates to improvements in combined poker and tongs.

The main objects of this invention are:

First, to provide a combined poker and tongs which may be used as a poker or adjusted for use as tongs.

Second, to provide an implement having these advantages which is comparatively light in weight and at the same time has sufficient strength for the intended purpose and one which is very easy to manipulate.

Third, to provide an implement of this character which is well adapted for use in removing clinkers from under-fed furnaces.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevation of an implement embodying my invention adjusted for use as a tongs.

Fig. 2 is a transverse section on line 2—2 of Fig. 1.

Fig. 3 is a transverse section on line 3—3 of Fig. 1.

Fig. 4 is a side elevation of the implement adjusted for use as a poker.

The embodiment of my invention illustrated comprises an elongated shaft 1 terminating at its outer end in a laterally disposed rearwardly inclined poker prong 2 which also constitutes a jaw in coaction with the jaw member 3. The shaft 1 and its prong 2 are formed integrally of rod stock, the shaft terminating at its inner end in a laterally disposed handle shank 4 aligned with the prong 2. The shank 4 is provided with a grip 5.

The jaw member 3 is provided with a disk-like jaw face 6 of generally rectangular shape having the corners thereof turned forwardly to provide angularly disposed teeth 7. This jaw member is rotatably and slidably mounted on the shaft 1.

The jaw member handle 8 is formed of bar stock, its outer end being turned laterally at 9 and disposed against the rear side of the jaw member and secured thereto by the rivet 10. The inner end of the jaw member handle is turned laterally at 11 and slidably and rotatably engages the shaft 1. This jaw member handle is preferably of flat springable stock and is provided with an offset 12 in spaced relation to the jaw member engaging the side of the shaft and constituting a fulcrum. There is sufficient spring in the handle to permit some springing action of the jaw or to springably support the jaw to render its engagement with clinkers more effective.

The jaw member handle 8 is provided with a grip 13 which is secured to the outer side thereof and adjacent the inner end of the handle, this grip being of a character to permit the operator to grasp the jaw member handle and the shaft with one hand while grasping the grip 5 with the other hand.

The jaw member and its handle may be swung to inoperative position, as shown in Fig. 4, in which position the implement may be used as a poker to loosen clinkers or to perform other work for which pokers are commonly used. The jaw member handle may be grasped in this position for manipulation as a poker.

I have illustrated and described my invention in an embodiment which I have found highly practical. I have not attempted to illustrate or describe certain modifications in structural detail which I contemplate as it is believed that this disclosure will enable those skilled in the art to embody or adapt my invention as may be desired.

Having thus described my invention, what I claim as new and desire to secure by Letters Patent, is:

1. A combined poker and tongs comprising a straight shaft terminating at its outer end in an integral laterally disposed rearwardly inclined prong at its inner end and at its outer end in an integral laterally disposed handle shank aligned with the prong, said shank being provided with a grip, a jaw member slidable and rotatable on said shaft and provided at its outer end with a disk-like jaw face having its edges conformed to provide a plurality of angularly disposed jaw teeth, and a bar-like springable jaw member handle having a laterally turned inner end slidably and rotatably engaging said shaft, its outer end being secured to the inner side of said jaw member in spaced relation to the shaft, said jaw member handle being in substantially parallel relation to the shaft and having an offset therein adjacent to but spaced from the jaw member to constitute a fulcrum whereby the jaw member is springably supported, the jaw member handle being provided with a grip and being of such length that the operator may grasp it and the shaft with one hand while grasping the handle of the shaft with the other hand.

2. A combined poker and tongs comprising a straight shaft terminating at its outer end in an integral laterally disposed prong at its inner end and at its outer end in a handle, a jaw member slidable and rotatable on said shaft, and a bar-like springable jaw member handle having a laterally turned inner end slidably and rotatably engaging said shaft, its outer end being secured to the inner side of said jaw member in spaced relation to the shaft, said jaw member handle being in substantially parallel relation to the shaft and having an offset therein adjacent to but spaced from the jaw member to constitute a fulcrum whereby the jaw member is springably supported, the jaw member handle being of such length that the operator may grasp it and the shaft with one hand while grasping the handle of the shaft with the other hand.

3. A combined poker and tongs comprising a shaft provided with a laterally disposed prong at its outer end and with a handle at its inner end, a jaw member slidable and rotatable on said shaft, and a bar-like springable jaw member handle having a laterally turned inner end slidably and rotatably engaging said shaft, its outer end being secured to the inner side of said jaw member in spaced relation to the shaft, said jaw member handle being in substantially parallel relation to the shaft and having an offset therein adjacent to but spaced from the jaw member to constitute a fulcrum whereby the jaw member is springably supported, the jaw member handle being of such length that the operator may grasp it and the shaft with one hand while grasping the handle of the shaft with the other hand, said jaw member and its handle being rotatable on said shaft.

4. A combined poker and tongs comprising a shaft provided with a laterally disposed prong at its outer end and with a handle at its inner end, a jaw member, and a jaw member handle having its outer end secured to the said jaw member in spaced relation to the shaft, said jaw member handle being in substantially parallel relation to the shaft and having an offset therein adjacent to but spaced from the jaw member to constitute a fulcrum, the jaw member handle being of such length that the operator may grasp it and the shaft with one hand while grasping the handle of the shaft with the other hand, said jaw member and its handle being rotatable on said shaft.

FRED W. BILLIG.

REFERENCES CITED

The following references are of record in the file of this patent:

UNITED STATES PATENTS

| Number | Name | Date |
|---|---|---|
| 824,642 | Gibbs | June 26, 1906 |
| 1,313,788 | Brown | Aug. 19, 1919 |
| 1,326,209 | Merriman | Dec. 30, 1919 |
| 1,353,428 | Selander | Sept. 21, 1920 |
| 1,508,641 | Boesrup | Sept. 16, 19294 |
| 1,722,953 | Cole | July 30, 1929 |
| 1,853,899 | Haverstick | Apr. 12, 1932 |